(12) United States Patent
Inam et al.

(10) Patent No.: US 12,693,663 B2
(45) Date of Patent: Jul. 28, 2026

(54) METHODS FOR RISK MANAGEMENT FOR AUTONOMOUS DEVICES AND RELATED NODE

(71) Applicant: Telefonaktiebolaget LM Ericsson (publ), Stockholm (SE)

(72) Inventors: Rafia Inam, Västerås (SE); Alberto Hata, Campinas SP (BR); Ahmad Ishtar Terra, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 374 days.

(21) Appl. No.: 17/631,991

(22) PCT Filed: Aug. 1, 2019

(86) PCT No.: PCT/SE2019/050722
§ 371 (c)(1),
(2) Date: Feb. 1, 2022

(87) PCT Pub. No.: WO2021/021008
PCT Pub. Date: Feb. 4, 2021

(65) Prior Publication Data
US 2022/0276650 A1    Sep. 1, 2022

(51) Int. Cl.
*G05D 1/00*    (2024.01)
*B60W 60/00*    (2020.01)

(52) U.S. Cl.
CPC ....... *G05D 1/0088* (2013.01); *B60W 60/0015* (2020.02); *G05D 1/0214* (2013.01);
(Continued)

(58) Field of Classification Search
CPC .... G05D 1/0088; G05D 1/0214; G05D 1/024; G06N 20/00; G06N 3/092; G06N 7/01;
(Continued)

(56) References Cited

U.S. PATENT DOCUMENTS

| | | | |
|---|---|---|---|
| 10,042,359 | B1 | 8/2018 | Konrardy et al. |
| 10,254,759 | B1 | 4/2019 | Faust et al. |

(Continued)

FOREIGN PATENT DOCUMENTS

| | | | |
|---|---|---|---|
| JP | 2019106049 A | * | 6/2019 |
| WO | 2018208984 A1 | | 11/2018 |
| WO | 2019002465 A1 | | 1/2019 |

OTHER PUBLICATIONS

Translation of JP-2019106049-A retrieved from Espacenet on Jan. 18, 2024 (Year: 2024).*

(Continued)

*Primary Examiner* — Fadey S. Jabr
*Assistant Examiner* — Faris Asim Shaikh
(74) *Attorney, Agent, or Firm* — Rothwell, Figg, Ernst & Manbeck, P.C.

(57) ABSTRACT

A method performed by a risk management node for autonomous devices. The risk management node may determine state parameters from a representation of an environment. The representation of the environment may include an object, an autonomous device, and a set of safety zones. The risk management node may determine a reward value based on evaluating a risk of a hazard with the object based on the determined state parameters and current location and speed of the autonomous device relative to a safety zone from the set of safety zones. The risk management node may determine a control parameter based on the determined reward value, and may initiate sending the control parameter to the autonomous device to control action of the autonomous device. The control parameter may be dynamically adapted to reduce the risk of hazard with the object based on reinforcement learning feedback from the reward value.

19 Claims, 7 Drawing Sheets

(52) U.S. Cl.
CPC ..... *B60W 2520/06* (2013.01); *B60W 2520/10* (2013.01); *B60W 2554/20* (2020.02); *B60W 2554/40* (2020.02); *B60W 2554/4042* (2020.02); *B60W 2554/4044* (2020.02); *B60W 2554/802* (2020.02)

(58) Field of Classification Search
CPC ... G06N 3/006; G06N 5/022; B60W 60/0015; B60W 2520/06; B60W 2520/10; B60W 2554/20; B60W 2554/40; B60W 2554/4042; B60W 2554/4044; B60W 2554/802; G05B 2219/33034; G05B 13/0265; G05B 19/4061; G05B 2219/39091; G05B 2219/40339; G05B 2219/40499; B25J 9/163; B25J 9/162
See application file for complete search history.

(56) References Cited

U.S. PATENT DOCUMENTS

| | | | | |
|---|---|---|---|---|
| 10,486,708 | B1 * | 11/2019 | Chan | G06V 40/20 |
| 11,436,504 | B1 * | 9/2022 | Lukarski | G06N 5/04 |
| 2006/0041381 | A1 * | 2/2006 | Simon | G08G 1/161 340/436 |
| 2008/0079731 | A1 * | 4/2008 | Shearer | G06T 15/40 345/473 |
| 2012/0046830 | A1 * | 2/2012 | Hojak | B61F 5/14 701/37 |
| 2014/0195121 | A1 * | 7/2014 | Castaneda | B66F 9/07581 701/41 |
| 2015/0151748 | A1 * | 6/2015 | Benmimoun | B60W 50/14 701/1 |
| 2015/0332103 | A1 * | 11/2015 | Yokota | G06F 16/5854 348/149 |
| 2018/0059682 | A1 * | 3/2018 | Thode | G05D 1/672 |
| 2018/0157973 | A1 | 6/2018 | El-Yaniv et al. | |
| 2018/0164825 | A1 * | 6/2018 | Matus | G08G 1/096725 |
| 2018/0339730 | A1 * | 11/2018 | Hovis | G06V 20/52 |
| 2019/0113918 | A1 * | 4/2019 | Englard | G05D 1/0088 |
| 2019/0228309 | A1 | 7/2019 | Yu et al. | |
| 2019/0329772 | A1 * | 10/2019 | Graves | B60W 30/0956 |
| 2020/0073401 | A1 * | 3/2020 | Szatmary | B60T 7/00 |
| 2020/0074491 | A1 * | 3/2020 | Scholl | G06V 20/597 |
| 2020/0081436 | A1 * | 3/2020 | Kizumi | B60W 30/10 |
| 2020/0192359 | A1 * | 6/2020 | Aragon | G05D 1/0061 |
| 2020/0276988 | A1 * | 9/2020 | Graves | G06N 5/048 |
| 2020/0285885 | A1 * | 9/2020 | Hoang | G06F 18/21 |
| 2020/0286310 | A1 * | 9/2020 | Carver | G07C 5/0816 |
| 2020/0293970 | A1 * | 9/2020 | Hwang | G06Q 10/0635 |
| 2020/0356855 | A1 * | 11/2020 | Yeh | G06F 40/216 |
| 2020/0372397 | A1 * | 11/2020 | Lee | G06Q 10/0635 |
| 2021/0179096 | A1 * | 6/2021 | Shalev-Shwartz | B60W 60/0015 |
| 2021/0183249 | A1 * | 6/2021 | Beauchamp | G08G 1/163 |
| 2021/0339742 | A1 * | 11/2021 | Chang | B60W 30/0956 |
| 2021/0370921 | A1 * | 12/2021 | Silva | B60W 60/0027 |

OTHER PUBLICATIONS

ISO "Robots and robotic devices—Safety requirements for industrial robots—Part 1: Robots" International Standard ISO, 10218-1, Second edition, Jul. 1, 2011, 50 pages.

ISO "Robots and robotic devices—Safety requirements for industrial robots—Part 2: Robot systems and integration" International Standard ISO, 10218-2, First edition, Jul. 1, 2011, 80 pages.

ISO/TS "Robots and robotic devices—Collaborative robots" Technical Specification, ISO/TS 15066, First edition, Feb. 15, 2016, 40 pages.

Liao et al. "On Support Relations and Semantic Scene Graphs" arXiv:1609.05834v4 [cs.CV] Nov. 16, 2017, 12 pages.

Inam et al. "Risk Assessment for Human-Robot Collaboration in an automated warehouse scenario" IEEE, 2018, pp. 743-751.

ISO "Road vehicles—Functional safety—Part 10: Guidelines on ISO 26262" International Standard ISO 26262-10, Second edition Dec. 2018, 90 pages.

International Search Report and the Written Opinion of the International Searching Authority, issued in corresponding International Application No. PCT/SE2019/050722, dated May 8, 2020, 13 pages.

K. Eder, C. Harper and U. Leonards, "Towards the safety of human-in-the-loop robotics: Challenges and opportunities for safety assurance of robotic co-workers'," The 23rd IEEE International Symposium on Robot and Human Interactive Communication, 2014, pp. 660-665, doi: 10.1109/ROMAN.2014.6926328.

* cited by examiner

Figure 6

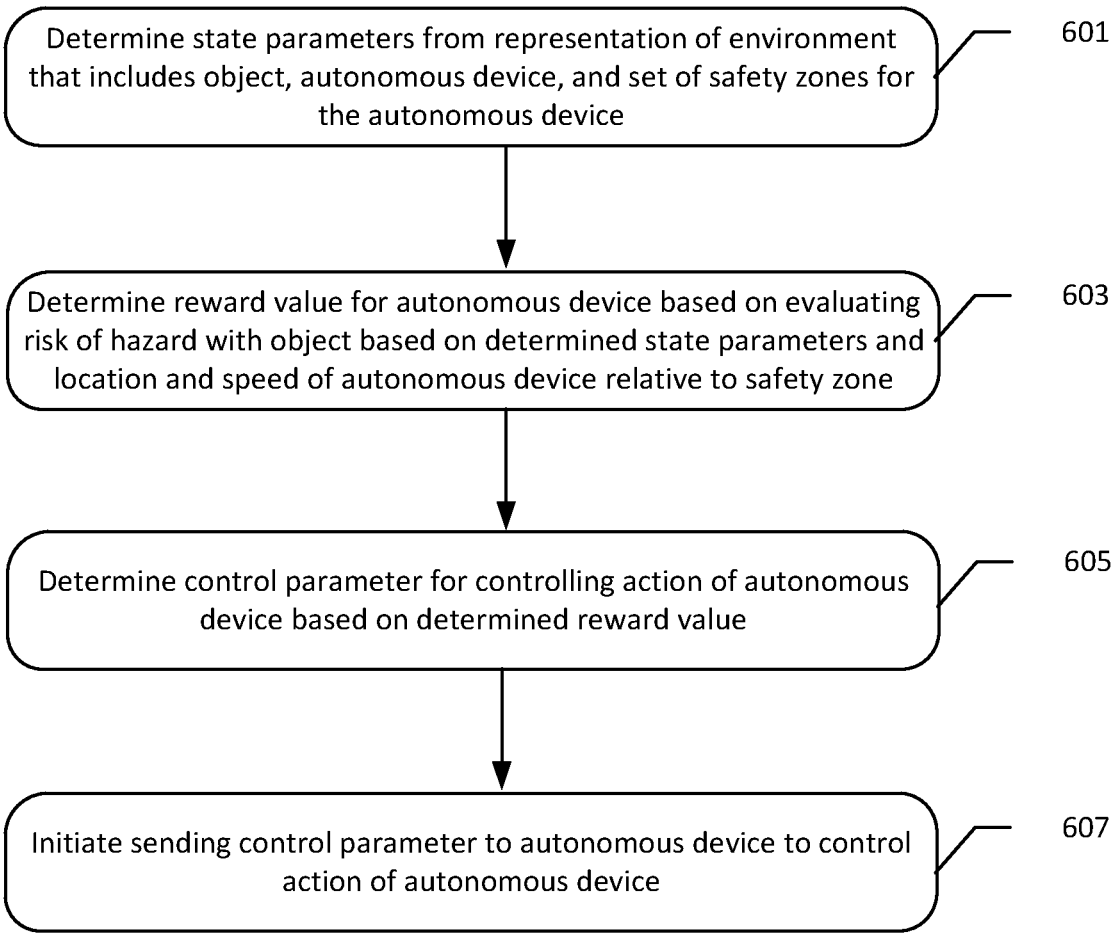

Determine state parameters from representation of environment that includes object, autonomous device, and set of safety zones for the autonomous device          601

Determine reward value for autonomous device based on evaluating risk of hazard with object based on determined state parameters and location and speed of autonomous device relative to safety zone          603

Determine control parameter for controlling action of autonomous device based on determined reward value          605

Initiate sending control parameter to autonomous device to control action of autonomous device          607

Figure 7

Repeat determining state parameters, determining the reward value, determining the control parameter, and initiating sending the control parameter to control action of the autonomous device          701

Figure 8

Send control parameter to controller for autonomous device for application to trajectory of autonomous device — 801

METHODS FOR RISK MANAGEMENT FOR AUTONOMOUS DEVICES AND RELATED NODE

CROSS REFERENCE TO RELATED APPLICATION(S)

This application is a 35 U.S.C. § 371 National Phase Entry Application from PCT/SE2019/050722, filed Aug. 1, 2019, designating the United States, the disclosure of which is incorporated herein by reference in its entirety.

TECHNICAL FIELD

The present disclosure relates generally to autonomous device risk management using a reinforcement learning-based risk management node.

BACKGROUND

The use of autonomous devices that work closely with humans (e.g., robots, autonomous vehicles, etc.) is increasing.

Autonomous devices may work as autonomous agents which can make decisions independently, and move around in many cases in the presence of other agents, objects and humans. Autonomous devices may use Artificial Intelligence (AI) algorithms to perform different tasks, such as path planning, object recognition, localization, etc. Research on safety issues that originate from deployment of autonomous AI-based agents has become a hot-topic due to the improving abilities of such systems. Different safety standards are provided for this purpose, such as International Standards Organization (ISO) 26262 for vehicles, ISO 10218-1, ISO 10218-2 for robots and ISO/TS 15066:2016 for collaborative robots. However, in most cases (particularly for collaborative robots) these standards are not fully matured and safety is still an issue.

SUMMARY

According to some embodiments of inventive concepts, a method performed by a risk management node may be provided. The risk management node may determine state parameters from a representation of an environment that includes at least one object, an autonomous device, and a set of safety zones for the autonomous device relative to the at least one object. The risk management node may further determine a reward value for the autonomous device based on evaluating a risk of a hazard with the least one object based on the determined state parameters and current location and current speed of the autonomous device relative to a safety zone from the set of safety zones. The risk management node may further determine a control parameter for controlling action of the autonomous device based on the determined reward value. The risk management node may further initiate sending the control parameter to the autonomous device to control action of the autonomous device. The control parameter may be dynamically adapted to reduce the risk of hazard with the at least one object based on reinforcement learning feedback from the reward value According to some other embodiments of inventive concepts, a risk management node may be provided. The risk management node may include at least one processor, and at least one memory connected to the at least one processor to perform operations. The operations may include determining state parameters from a representation of an environment that includes at least one object, an autonomous device, and a set of safety zones for the autonomous device relative to the at least one object. The operations may further include determining a reward value for the autonomous device based on evaluating a risk of a hazard with the least one object based on the determined state parameters and current location and current speed of the autonomous device relative to a safety zone from the set of safety zones. The operations may further include determining a control parameter for controlling action of the autonomous device based on the determined reward value. Further, the operations may include initiating sending the control parameter to the autonomous device to control action of the autonomous device. The control parameter may be dynamically adapted to reduce the risk of hazard with the at least one object based on reinforcement learning feedback from the reward value.

According to some embodiments, a computer program may be provided that includes instructions which, when executed on at least one processor, cause the at least one processor to carry out methods performed by the risk management node.

According to some embodiments, a computer program product may be provided that includes a non-transitory computer readable medium storing instructions that, when executed on at least one processor, cause the at least one processor to carry out methods performed by the risk node.

Other systems, computer program products, and methods according to embodiments will be or become apparent to one with skill in the art upon review of the following drawings and detailed description. It is intended that all such additional systems, computer program products, and methods be included within this description and protected by the accompanying claims.

Operational advantages that may be provided by one or more embodiments may include enabling development of a more robust system that enhances safety of operation of autonomous devices while dynamically adapting to machine learned experiences during operation of the autonomous devices. A further advantage may provide for a reinforcement learning-based solution for risk management of autonomous devices that may be adaptive in nature using multi-layered safety zones and semantic information of an environment.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 6-8 are flowcharts illustrating operations that may be performed by a risk management node in accordance with some embodiments of the present disclosure.

DETAILED DESCRIPTION

Figure 1:
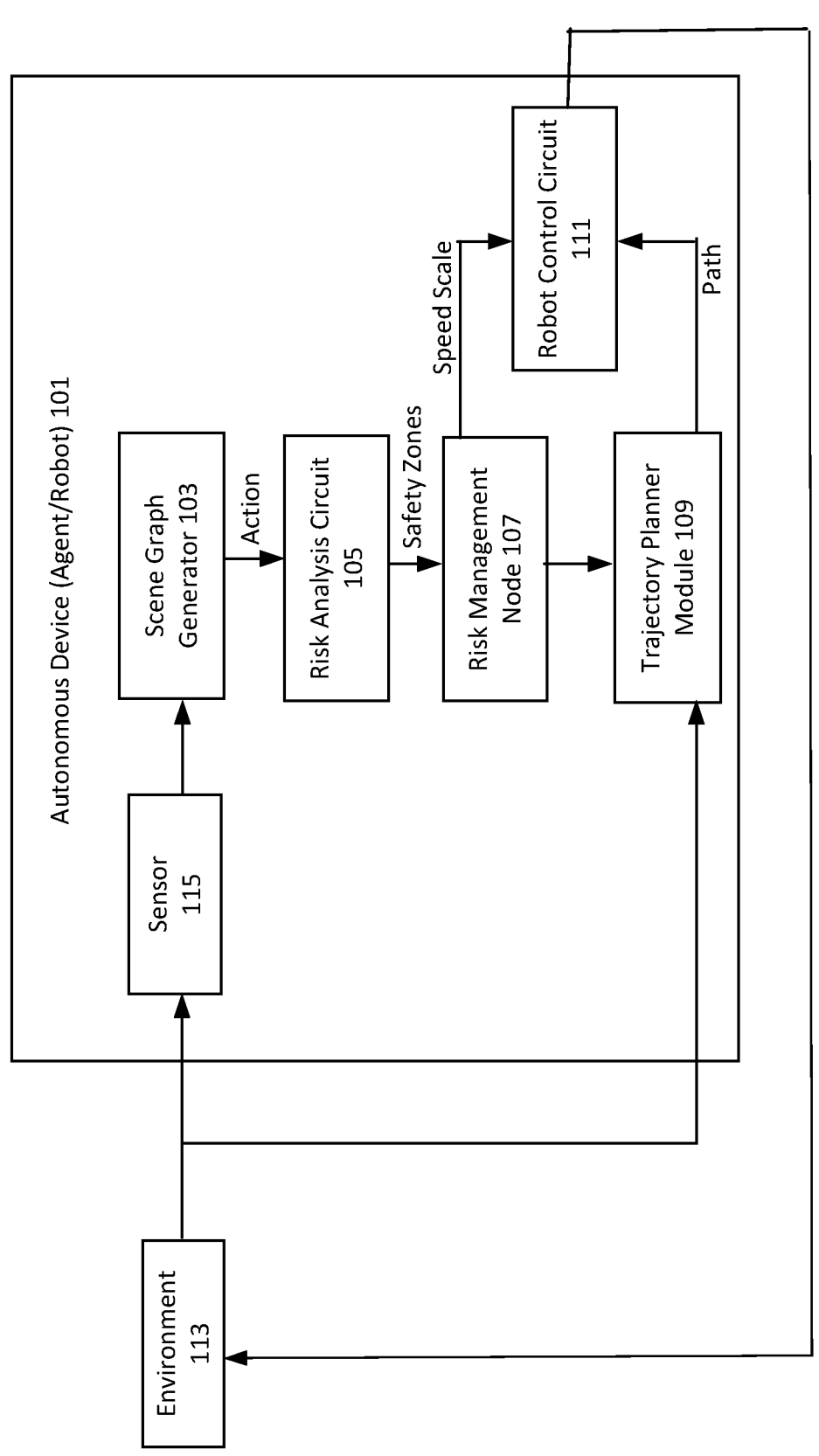
FIG. 1 illustrates an overview of an environment and autonomous device that includes a reinforcement learning-based risk management node in accordance with some embodiments of the present disclosure.

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, an autonomous device (also referred to as a robot or an agent) may include any autonomous device including, but not limited to, any mobile robot platform such as research robots, automated ground vehicle (AGV), autonomous vehicle (AV), service robots, mobile agents, and collaborative robots where humans and robots share the environment without having boundaries (e.g., in human-robot collaboration (HRC) operations. HRC collaboration may refer to an environment where humans and robots work closely to accomplish a task and share the work space).

One example of an autonomous device is an AV that may need to keep a safe distance between the AV and obstacles in real-time. One approach may be to use a safety zone (or safety bubble) around the AV during movement of the AV. For example, some safety standards for AVs may define or provide guidance about the size of the safety bubble. The safety bubble may be a virtual space cushion which separates the AV from potential hazards such as other moving vehicles, parked vehicles, trees, road barriers, etc. The empty space may give the AV time to see, react to, and avoid problems that may arise on the road around the AV.

In some approaches, risk management may be employed to aid autonomous device navigation in an environment (e.g., avoiding collisions). According to ISO 31000, risk management may include several steps, such as risk analysis and risk mitigation. In risk analysis, objects that surround an autonomous device may be identified and a risk level for the objects may be evaluated. In risk mitigation, autonomous device controls for lowering the risk may be calculated.

In some approaches, risk management may be implemented using different AI algorithms such as fuzzy logic, reinforcement learning (RL), etc. In the context of RL, safety processes may be important for enabling continued learning. A technical challenge for RL, however, may be to transpose a gap that may exist between simulated training and real-world actuation. Therefore, attempts to deploy or productify autonomous AI agents may need strict safety processes, e.g. smart manufacturing. In an HRC collaborative environment these aspects may be particularly aggravated.

Some safety standards may address collaborative tasks performed between a fixed robot (e.g., robot arms) and a human.

A potential disadvantage of approaches discussed above may be that safety is addressed at some level but the methods are not sufficient to address safety in a HRC scenario or other scenario with no or limited boundaries between an autonomous device and humans. A further potential disadvantage may be that risk management may be addressed through reactive navigation that is not prepared to deal with unforeseen situations.

Additional potential limitations with such approaches may include:

(1) Standards have been developed mainly for non-collaborative devices, and may not cover freely-moving devices.

(2) Some approaches may address risk mitigation by reactively avoiding obstacles. Avoiding obstacles, however, may be a limitation in environments where an autonomous device may need to reach a certain object/target, such as in a warehouse environment where the autonomous device needs to reach and move an object/target item.

(3) Some approaches may not incorporate semantic and contextual information from the environment during the risk mitigation process. Semantic and contextual information from the environment may distinguish properties of the obstacle so the agent/robot can react/mitigate the risk accordingly. For example, there may be more risk if the obstacle is human as compared to an obstacle which is a static object like a wall.

(4) Safety analysis work may provide safety without considering efficiency. For example, a safety bubble may focus on a safety aspect, without considering a potential decrease in efficiency (e.g., for vehicles it could be the effect on traffic flow, or for robots it could reduce the working efficiency of the whole system).

Certain aspects of the present disclosure and their embodiments may provide solutions to these and/or other challenges. FIG. 1 illustrates an autonomous device 101 (also referred to as an agent or a robot) in an environment 113 that includes a RL-based risk management node 107 for controlling actions of autonomous device 101 in accordance with various embodiments. The autonomous device 101 also may include a scene graph generator 103, a risk analysis circuit 105, a trajectory planner module 109, and a robot controller circuit 111. Although risk management node 107 is shown onboard autonomous device 101, risk management node 107 may be a node located in a radio access network or wireless network that is in communication with autonomous device 101. As used herein, RL may include any machine learning where an agent takes actions in an environment, which may be interpreted into a reward and a representation of at least one state parameter, which are feedback into the agent including, but not limited to, deep deterministic policy gradient, asynchronous actor-critic algorithm, Q-learning with normalized advantage functions, trust region policy optimization, proximal policy optimization, etc.

Certain embodiments may provide one or more of the following technical advantages. A potential advantage of various embodiments may include that risk management node 107 incorporates the current environment 113 around autonomous device and at least one state parameter of autonomous device 101 in an improved manner in contrast to, for example, using a predefined speed for a safety bubble. State parameters of autonomous device 101 (also referred to herein as state or states) may include one or more of the distance between autonomous device 101 and an obstacle; maximum stopping distance of autonomous device 101 based on current speed and weight of autonomous device 101; current direction of autonomous device 101; current speed of autonomous device 101; current location of autonomous device 101; distance of at least one obstacle from a safety zone in a set of safety zones for autonomous device 101; direction of the at least one object relative to a surface of autonomous device 101; a risk value for the at least one object based on a classification of the at least one object; etc. Thus, autonomous device may avoid collision with an obstacle by reducing speed of autonomous device 101 or autonomous device 101 braking in less distance to the obstacle. Brake intensity and braking distance of autonomous device may be dependent on its current speed and payload (that is, the weight of autonomous device 101 itself and the weight that it carries) which is dynamic. Thus, controlling speed of autonomous device 101 based on current context may be important for a dynamic environment 113.

A further potential advantage may be that a representation of environment 113 may be used to input current context for a dynamic environment to a processor for performing a RL-based operations. Some embodiments may provide for a RL-based solution that may be adaptive in nature, including in case of collaborative devices. Various embodiments may provide for use of multi-layered safety zones and semantic information of an environment (e.g., in a representation of the environment, such as in a scene graph). Some embodiments may provide for increased precision and fine-grained control of operations of autonomous devices. Some embodiments may further provide for continuous refinement of operations of the autonomous device from the interaction with the environment. Some embodiments may further provide for transfer of a good performing model to other models having the same formulation.

An example of a HRC where humans and robots work closely to accomplish a task and share work space is described, for example, in Rafia Inam, Klaus Raizer, Alberto Hata, Ricardo Souza, Elena Fersman, Enyu Cao, Shaolei Wang, *Risk Assessment for Human-Robot collaboration in an Automated Warehouse Scenario*, IEEE 23rd International Conference on Emerging Technologies and Factory Automation (ETFA'18), Torino, Italy, 4-7 Sep. 2018 (Inam). Inam describes a safety analysis by assessing potential risk of obstacles around HRC robots. The safety analysis in Inam describes use of three safety zones around a robot. The safety zones described in Inam included different levels of safety described as:

Clear zone (or green zone): an obstacle in this zone may be considered in a safe distance to the robot Warning zone (or yellow zone): if there is an obstacle in this zone, the robot may adapt its behavior for a safe operation Critical zone (or red zone): an obstacle in this zone may be considered a critical threat and the robot may avoid damage/injury by reducing its movement or stopping its activity.

Various embodiments of the present disclosure include multiple layered safety-zones (e.g., three layers of safety zones). Although various embodiments are described with reference to three layered safety zones, the embodiments are not so limited and may include different numbers of multiple safety zones. In various embodiments, a representation (e.g., a scene graph) of an environment proximate an autonomous device may be used to capture information about the environment, including relationships of the autonomous device with the environment. A RL-based risk management node may process the captured information, including linking a reward function with the multiple safety zones thus directly learning from the environment.

Referring again to FIG. 1, a mobile autonomous device may perform its task(s) by navigating through environment 113 (e.g., a warehouse). Autonomous device may follow a certain trajectory generated by a trajectory planner module 109 that knows a map of environment 113. However, in an actual operation, autonomous device 101 may work together with other elements such as other devices and humans in environment 113. An obstacle around the path of autonomous device may create a potential hazard, both to autonomous device 101 and to the obstacle. Thus, a risk management node 107 may be implemented to reduce potential hazards that may occur.

Referring again to FIG. 1, some embodiments of the present disclosure are directed to a risk management node 107 for an autonomous device 101 that may monitor and take measurements of environment 113 through an exteroceptive sensor 115 and use the measurements to build a semantic and contextual representation of the environment, such as a scene graph. Autonomous device 101 may include a scene graph generator 103 for building the scene graph. The representation may be used by risk analysis circuit 105 to evaluate a risk level associated with each obstacle in environment 113. Risk management node 107 may determine risk mitigation or reduction that can be used to calculate a control for autonomous device that may reduce the risk level(s). RL may be used in risk management node 107 to compute the control based on a current autonomous device state and reward.

In various embodiments, risk management node 107 may include a RL algorithm. The RL algorithm may include safety zones in a reward function. Risk management node 107 may use a representation of environment 113 to evaluate a current autonomous device state.

In some RL algorithm approaches, a reward function may be based on a fixed distance between the autonomous device and the closest obstacle. In contrast, in various embodiments of the present disclosure, risk management module 107 may be configured to determine a dynamic reward value that depends on a distance between autonomous device 101 and an obstacle, and additional parameters. The additional parameters may include, but are not limited to, multiple safety zones and a maximum stopping distance of autonomous device 101 that is based on a current speed and weight of autonomous device 101. In some embodiments, when autonomous device 101 is located near an obstacle, autonomous device 101 may receive a good reward if the speed is low. This may be a potential advantage of some embodiments of the present disclosure in contrast with some RL approaches. In some RL approaches, a reward function may depend only on a distance between an obstacle and an autonomous device, which may result in the robot receiving a bad reward when the autonomous device stays/moves near the obstacle. In contrast, a potential advantage of various embodiments of the present disclosure may be that efficiency of autonomous device 101 may be improved because autonomous device 101 may receive a good reward when autonomous device 101 stays/moves near an object when the speed of autonomous device 101 is low.

Another potential disadvantage of some approaches may be that an autonomous device may have a predefined speed where the autonomous device may handle the situation similarly (e.g., avoiding the obstacle) regardless of the obstacle's type and potential risk. In contrast, a potential advantage of various embodiments of the present disclosure may be that risk management node 107 may output control parameters to control the speed and direction of autonomous device 101 from current context of the environment. For example, risk management node 107 may output two mutually exclusive control parameters, e.g., a speed scale for a left wheel of autonomous device 101 and a speed scale for a right wheel of autonomous device 101, so that the speed and direction of movement of autonomous device 101 are controlled. Determining a control parameter for controlling action of autonomous device 101 (such as speed and direction of movement) based on a reward value determined by risk management node 107 may provide advantages over some approaches that use a predefined speed. With a predefined speed, an autonomous device may only reduce speed without changing the direction that the autonomous device is travelling (e.g., the autonomous device still approaches the obstacle with a slower speed).

Although a control parameter to control speed of a wheel(s) of autonomous device 101 is used in some examples, the output of risk management node 107 may be a control parameter for controlling movement of any actuator that operates to move all or part of autonomous device 101 including, but not limited to, a wheel(s) or a joint(s) of autonomous device 101.

In various embodiments of inventive concepts, a method may be performed by a risk management node 107 that may use information from a scene graph and reinforcement learning for risk mitigation or reduction for autonomous devices (e.g., robots). Autonomous device (s) 101 may be equipped with at least one exteroceptive sensor 115 (e.g., camera, lidar, etc.) to perform measurements of an environment 113 proximate robot(s) 101.

The measurements may be sent to scene graph generator 103 which may include a computer vision system that extracts objects from the sensor data and builds a semantic representation of the environment. Objects from the scene graph may be analyzed and evaluated by risk analysis circuit 105 for their corresponding risk level. The scene graph and the risk levels may be sent to risk management node 107. Risk management node 107 may include one or more processors (as described in more detail below) which may execute a RL algorithm to calculate a current state of autonomous device 101 and a reward. A current state of autonomous device 101 may include, but is not limited to, one or more of the distance between autonomous device 101 and an obstacle; maximum stopping distance of autonomous device 101 based on current speed and weight of autonomous device 101; current direction of autonomous device 101; current speed of autonomous device 101; current location of autonomous device 101; distance of at least one obstacle from a safety zone in a set of safety zones for autonomous device 101; direction of the at least one object relative to a surface of autonomous device 101; a risk value for the at least one object based on a classification of the at least one object; etc. Risk management node 107 may formulate the state and reward to minimize or reduce a potential risk. For example, the at least one processor of risk management node 107 may execute a RL algorithm to calculate a scale of wheel speeds for autonomous device 101 for reducing a potential risk.

Meanwhile, at least one processor of trajectory planner module 109 of autonomous device 101 may compute a path and a velocity that autonomous device 101 may follow to reach a certain object/target. At least one processor of robot controller 111 may combine the speed scale and the trajectory to compute movements that autonomous device 101 may perform in environment 113. Interaction with environment 113 may be performed in a continuous loop until autonomous device 101 achieves a certain target.

As discussed above, a representation of environment 113 may be included in a scene graph. A scene graph is a graph structure that may be effective for representing physical and contextual relations between objects and scenes. See e.g., Michael Ying Yang, Wentong Liao, Hanno Ackermann, and Bodo Rosenhahn, *On support relations and semantic scene graphs*, ISPRS Journal of Photogrammetry and Remote Sensing, 131:15-25, 2017. A potential advantage of a scene graph may be its level of interpretability by both machines and humans. A scene graph also may store information about an object's properties such as size, distance from the observer, type, velocity, etc.

In some embodiments of the present disclosure, a scene graph may represent environment 113. The scene graph may include information about an object's properties. Information about an object's properties may be used as an input to risk management node 107 and risk analysis circuit 105.

Figure 2:
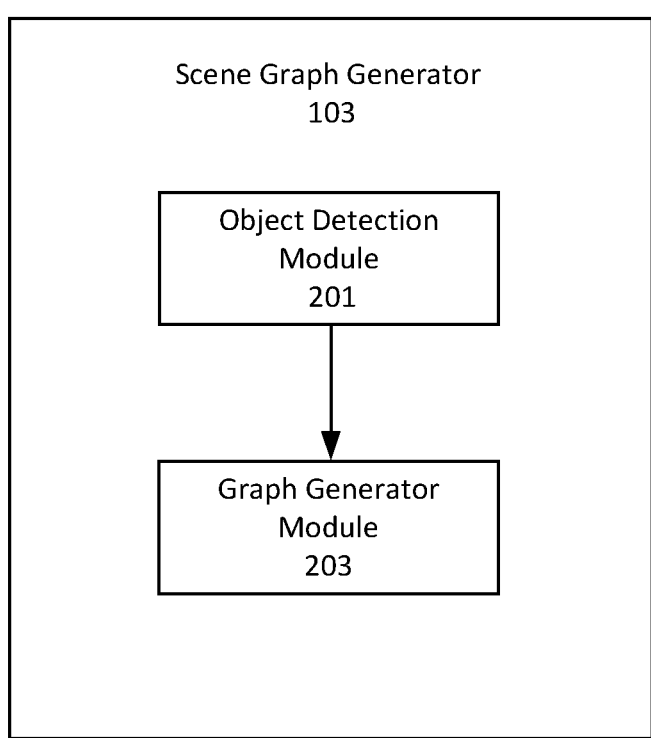
FIG. 2 illustrates a scene graph generator.

To construct a scene graph, measurements of environment 113 may be processed through an object detection method and the object properties may be extracted. FIG. 2 illustrates a process of scene graph construction. Referring to FIG. 2, scene graph generator 103 may include an object detection module 201 and a graph generator module 203. Object detection module 201 may detect objects in the field of view of autonomous device 101. Object detection module 201 may extract properties of one or more objects in environment 113. Graph generator module 203 may organize information from object detector module 201 in a semantic and contextual way.

A structure of a scene graph may be formed by nodes that may represent the objects that are in the field of view of autonomous device 101, and the edges may represent a semantic relationship between these objects. An example of a scene graph structure 300 dynamically generated by an autonomous device 101 in or proximate a warehouse environment 113 is illustrated in FIG. 3.

Figure 3:
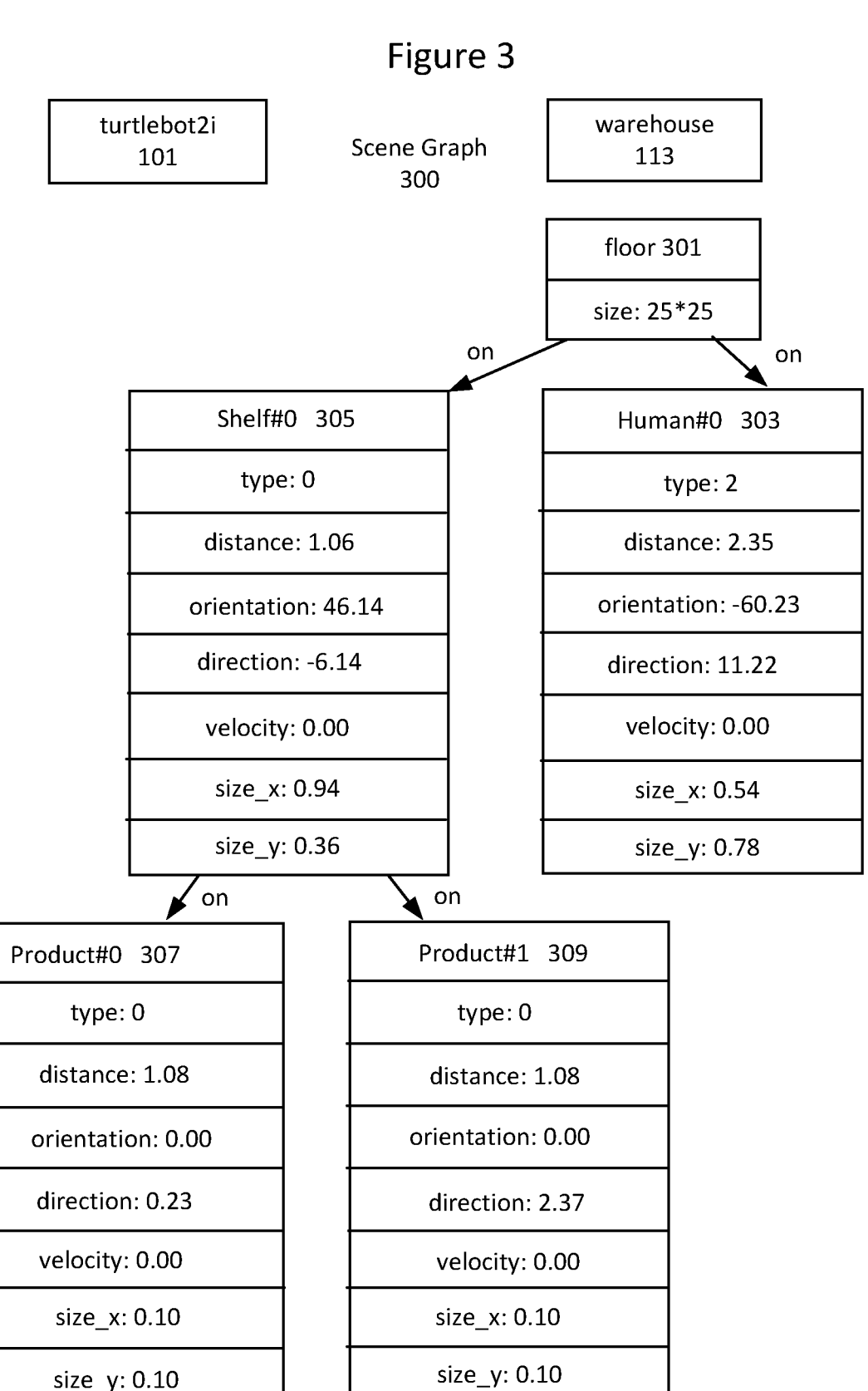
FIG. 3 illustrates an exemplary scene graph representation generated by an autonomous device in a warehouse environment.

Referring to FIG. 3, warehouse 113 is a root node of scene graph structure 300. Floor 301 is a child node of warehouse node 113. Floor 301 is an element that connects objects in the scene. Objects detected by autonomous device 101 are depicted below the floor node 301 and an edge of floor node 301 is labeled with "on", which represents the placement of two exemplary objects on floor 301. Human 303 and shelf 305 are two objects depicted as grandchildren nodes "on" floor node 301. Additional objects detected by autonomous device 101 are depicted below shelf node 305 and an edge of shelf node 305 is labeled with "on", which represents the placement of two exemplary products on shelf 305. Product 307 and product 309 are depicted as great grandchildren nodes "on" shelf node 305. With scene graph structure 300, risk management node 107 may use the contextual information provided by scene graph structure 300 for risk assessment and to generate control parameters with respect to each object in scene graph structure 300.

Still referring to FIG. 3, each node may have property attributes (also referred to as environment parameters). For example, floor node 301 has a size attribute of 25 meters by 25 meters. Human node 303 has seven attributes: a type attribute (e.g., type 2 for human), a distance attribute (e.g., 2.35 meters from a surface of autonomous device 101), an orientation attribute (e.g., −60.23° from face of human 303 to autonomous device 101), a direction attribute (e.g., 11.22° from a font surface of autonomous device 101 to human 303), a velocity attribute (e.g., velocity of human 303 is 0.00 meters per second), a size attribute in the x direction (e.g., 0.54 meters), and a size attribute in the y direction (e.g., 0.78 meters). Type attribute of objects may include, but is not limited to, three types (0 for a static object, 1 for a dynamic object, and 2 for a human).

In various embodiments, risk management node 107 may use at least one processor to execute a RL-based risk mitigation algorithm by taking information (e.g., environment parameters) input from a representation of environment 113, such as scene graph structure 300, and converting the attributes to discrete states for each property attribute. Output of risk management node 107 may be, but is not limited to, a speed scale for each actuator of autonomous device 101.

Figure 4:
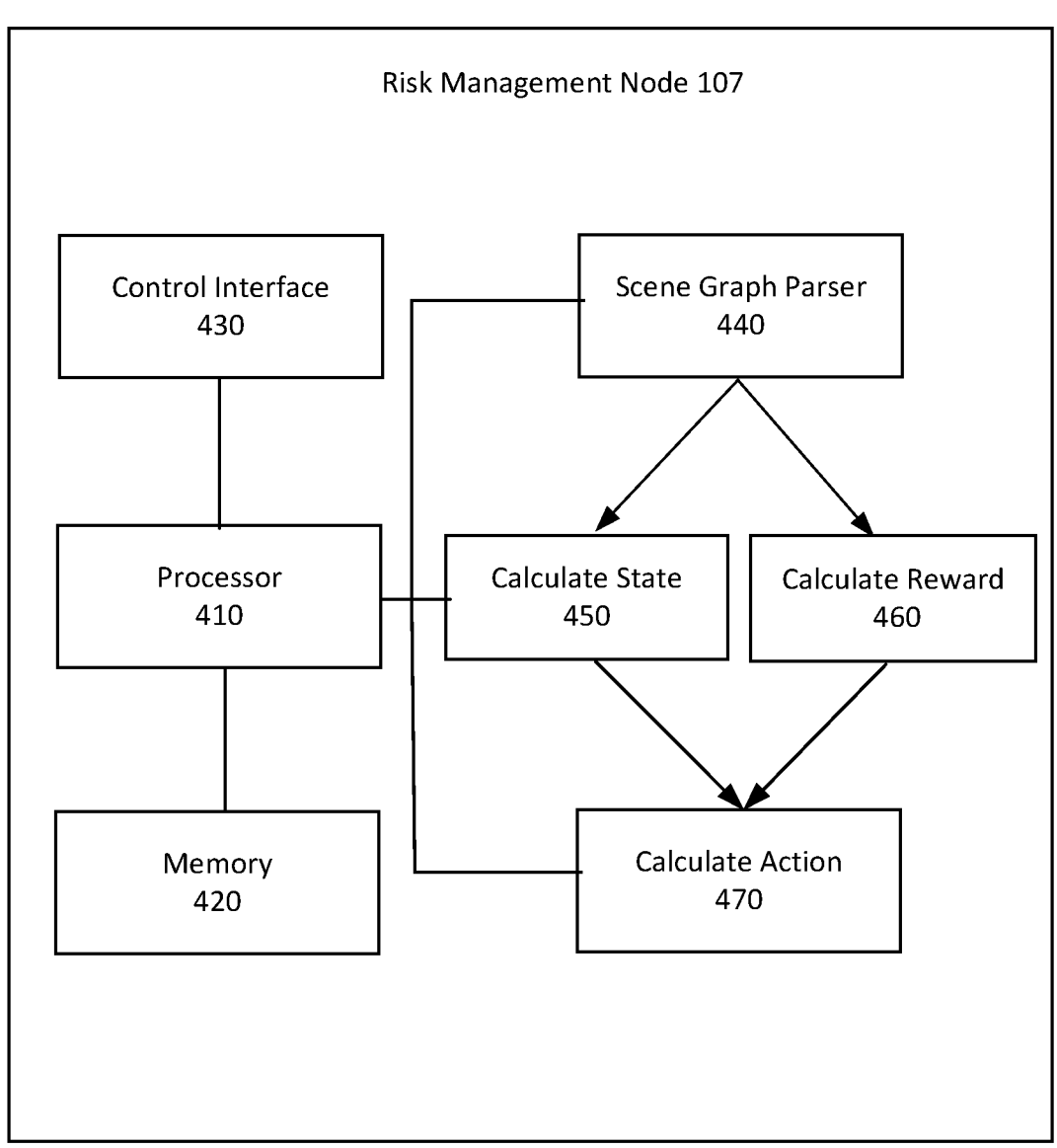
FIG. 4 is a block diagram of operational modules and related circuits of a risk management node in accordance with some embodiments of the present disclosure.

FIG. 4 is a block diagram illustrating elements of a risk management node 107 (also referred to as a node) that is configured according to various embodiments. Risk management node 107 may be located onboard autonomous device 101 or may be located in a network that is in radio or wireless communication with autonomous device 101. As shown, the risk management node 107 includes at least one processor circuit 410 (also referred to as a processor), at least one memory circuit 420 (also referred to as memory), and a control interface 430 (e.g., a wired control interface and/or wireless control interface) configured to communicate with autonomous device 101. Risk management node 107 may be configured as a node in a radio access or wireless network, and may contain a RF front end with one or more power amplifiers that transmit and receive through antennas of an antenna array. The at least one memory 420 stores computer readable program code that when executed by the at least one processor 410 causes the processor 410 to perform operations according to embodiments disclosed herein.

Still referring to FIG. 4, risk management node 107 may calculate one or more states 450 for reinforcement learning by discretizing information extracted from a scene graph structure by scene graph parser 440. For example:

Rotational speed: Risk management node 107 may need to know the current direction of the autonomous device (e.g., whether it is moving straight or turning left/right).

Obstacle's distance: The distance of the obstacle from the autonomous device. This information may be discretized according to the safety zones' radius and several more layers. For example:

Critical zone radius: 0.3 m
Warning zone radius: 0.6 m
Safe zone radius: 0.9 m
Added layer 1: 1.3 m
Added layer 2: 1.8 m
Added layer 3: 2.5 m In this example, the distance information is discretized into 7 states (6 states if the obstacle's distance is less than the mentioned layers and 1 state if the distance is greater than 2.5 m).

Obstacle's direction: This property may discretize the direction of the obstacle relative to the autonomous device's front side. For example, the direction may be discretized into 5 states which are left, front left, front, front right, and right. This information may be needed to determine whether the scaling speed is similar for both wheels (e.g., if the obstacle is not in front of the robot) or the scaling speed is different for each wheel (e.g., if the obstacle is in front of the autonomous device).

Obstacle's risk value: This property may inform risk management node 107 of how dangerous/risky the obstacle is that is located around the autonomous device. The obstacle's risk value may be discretized as one or more states (e.g., very low risk, low risk, medium risk, high risk, very high risk, etc.) based on the type of obstacle and other parameters such as the distance of the object to the autonomous device, the speed of the object, the autonomous device's own speed and direction, etc. For example, a human's risk value may be discretized as a high risk; another autonomous device may be discretized as a medium risk; and a shelf may be discretized as a low risk.

Still referring to FIG. 4, reward calculation will now be discussed. Reward is feedback for a RL system to measure action of the RL system to a certain condition. In various embodiments of the present disclosure, feedback for the autonomous device may be based on collision, location of obstacles, and movement of the autonomous device. Autonomous device 101 may determine a reward based on the current location of autonomous device 101 relative to one safety zone of the multiple safety zones (e.g., safe zone, warning zone, or critical zone). For example, a reward value can be formulated as follows:

If a collision happens: −10
If there is an obstacle in critical zone: −5
If there is an obstacle in warning zone: −1
If the robot has travelled for >0.5 meters: +10
None of the above: −0.05

A purpose of the reward calculation may be to calculate the reward value to try to minimize or reduce the risk of hazards to/from an object proximate autonomous device 101. Risk of hazards may include, but is not limited to, collision between autonomous device 101 and an object. Thus, if autonomous device 101 is rewarded positively, the action taken by autonomous device 101 may reduce the probability of collision with the object.

In various embodiments, an objective of the autonomous device may be to not maximize reducing the distance to the obstacle as autonomous device 101 keeps in a trajectory toward the goal/object (e.g., the distance between autonomous device 101 and product 307 on shelf 305 in warehouse 113). A potential advantage of various embodiments is that the reward calculation may be calculated from a scene graph structure which can introduce detailed information regarding the environment in contrast to if a reward was calculated using just raw sensor information.

Still referring to FIG. 4, in various embodiments, the output of risk management node 107 may be a speed scale for each actuator of autonomous device 101 from a calculate action module 470. For example, the output scale may be a value, such as 0.0, 0.4, 0.8, 1.2 meters per second. The speed scale may be applied in robot controller circuit 111 to a trajectory of autonomous device 101 from trajectory planning module 109.

Figure 5:
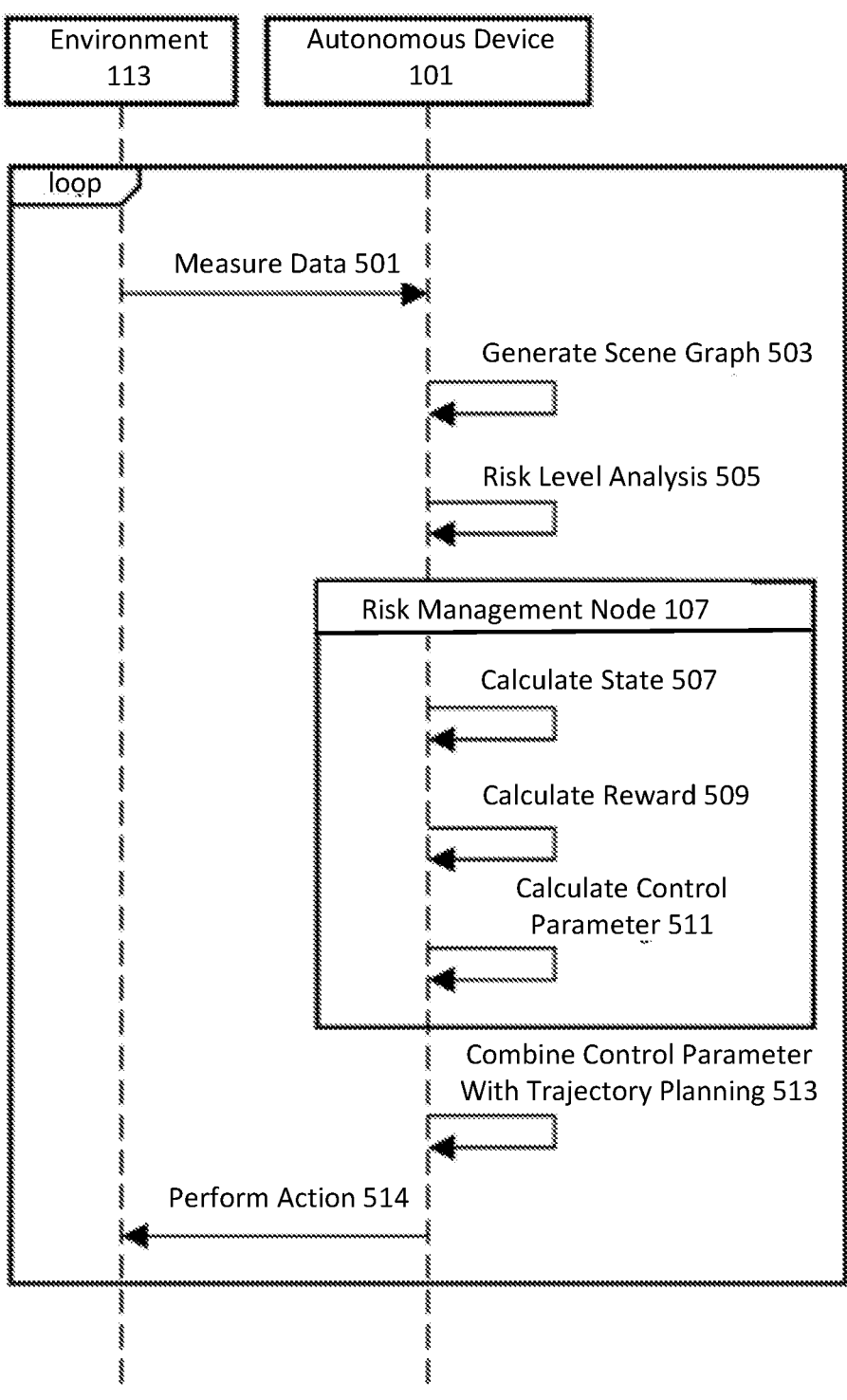
FIG. 5 is a sequence diagram illustrating operations of a risk management node in accordance with some embodiments of the present disclosure.

A sequence of operations that may performed by autonomous device 101, including operations that may be performed by risk management node 107, are illustrated in FIG. 5. In various embodiments, actors may include environment 113, which may include humans and other objects (such as other devices), and autonomous device 101. Autonomous device 101 may be an autonomous agent that interacts with environment 113 and may perform actions that minimize or reduce risk of hazards with objects in environment 113. Referring to FIG. 5, autonomous device 101 may measure data 501 with sensors of autonomous device 101. Scene graph generator 103 may convert the measurements to generate a scene graph structure 503 of environment 113. Scene graph structure 503 may be used as an input to risk analysis circuit 105 to calculate a risk level 505 of each object in the scene graph structure. The scene graph structure and the risk levels of the objects may be input to risk management node 107 for calculating a state 507, calculating a reward 509, and calculating a control parameter 511, which in turn may be modeled on top of reinforcement learning. Autonomous device 101 states and rewards may be calculated and suitable actions of autonomous device 101 may be obtained to try to maximize the reward (or in other words, to try to minimize or reduce the risk of hazards). The obtained action (e.g., speed scale) may be combined 513 with an output of trajectory planning module 109 and controls may be sent to autonomous device 101 to control interactions of autonomous device 101 with environment 113. The sequence diagram of operations of FIG. 5 may be repeated in a loop for each object in the environment and/or for the same object in environment 113 until a target/goal for the object is achieved.

Operations of risk management node 107 (implemented using the structure of the block diagram of FIG. 4) will now be discussed with reference to the flow charts of FIG. 6-8 according to some embodiments of inventive concepts. For example, modules may be stored in at least one memory 420 of FIG. 4, and these modules may provide instructions so that when the instructions of a modules are executed by at least one processor 410, at least one processor 410 performs respective operations of the flow charts.

Referring initially to FIG. 6, operations can be performed by a risk management node (e.g., 107) for controlling actions of an autonomous device (e.g., 101 in FIG. 1). The operations include determining 601 state parameters from a representation of an environment that includes at least one object, an autonomous device, and a set of safety zones for the autonomous device relative to the at least one object. The operations further include determining 603 a reward value for the autonomous device based on evaluating a risk of a hazard with the at least one object based on the determined state parameters and current location and current speed of the autonomous device relative to a safety zone from the set of safety zones. The operations further include determining 605 a control parameter for controlling action of the autonomous device based on the determined reward value. The operations further include initiating 607 sending the control parameter to a controller of the autonomous device to control action of the autonomous device. The control parameter is dynamically adapted to reduce the risk of hazard with the at least one object based on reinforcement learning feedback from the reward value.

Referring to FIG. 7, in at least some embodiments, the operations of determining the state parameters, determining the reward value, determining the control parameter, and initiating sending the control parameter to a controller to control action of the autonomous device may be repeated 701 until, for example, the autonomous device completes a task.

Referring again to FIG. 6, the state parameters may be determined from the representation of the environment based on determining discrete values for information from the representation of the environment. The discrete values for information may include at least one of a current direction of the autonomous device; a current speed of the autonomous device; a current location of the autonomous device; a distance of the at least one obstacle from a safety zone in the set of safety zones for the autonomous device; a direction of the at least one object relative to a surface of the autonomous device; and a risk value for the at least one object based on a classification of the at least one object. The risk value for the at least one object based on the classification of the at least one object is input to the risk management node from a risk analysis module that assigns the risk value. The classification of the object may include, but is not limited to, an attribute parameter identifying at least one object as including (but not limited to), for example, a human, an infrastructure, another autonomous device, or a vehicle.

The state parameters of operation 601 may be determined from inputting to the risk management node 107 each of the environment paraments from the scene graph structure (e.g., from scene graph parser 440) and converting each of the environment parameters to a discrete state parameter.

The set of safety zones may include a range of safety zones. Each safety zone in the range may have a different distance from the autonomous device and the autonomous device may have a different speed within each safety zone in the range of safety zones.

The reward value of operation 603 may include a defined numerical value based on the evaluated risk of hazard with the at least one object.

The control parameter of operation 605 may include a speed of at least one actuator of the autonomous device and/or an angle of at least one actuator of the autonomous device.

In some embodiments, the representation of the environment may include a scene graph structure of the at least one object and a relationship of the least one object with the autonomous device and the environment, respectively. The scene graph structure may be based on environment parameters measured by the autonomous device including, but not limited to, for example at least one of: a distance of the at least one object from a surface of the autonomous device; an orientation of a surface of the at least one object from the autonomous device; a direction of the at least one object from a surface of the autonomous device; a velocity of the at least one object; a width dimension of the at least one object; a length dimension of the at least one object; and a height dimension of the least one object.

Figure 8:
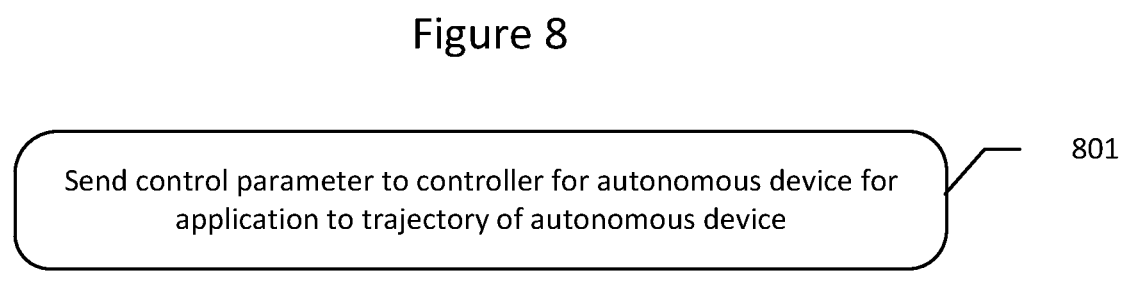

Referring to FIG. 8, in at least some embodiments, the operations may further include sending 801 the control parameter to a controller 111 for autonomous device 101 for application to a trajectory for autonomous device 101.

The operations from the flow chart of FIGS. 7 and 8 may be optional with respect to some embodiments.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method performed by a risk management node, the method comprising:

generating a scene graph structure of an environment based on sensor data, wherein the scene graph structure includes at least one object, a relationship of the least one object with an autonomous device and the environment, and one or more environment parameters;

determining state parameters from the scene graph structure of the environment that includes the at least one object, the autonomous device, and a set of safety zones for the autonomous device relative to the at least one object, wherein determining the state parameters comprises converting each of the one or more environment parameters to a discrete state parameter;

determining a reward value for the autonomous device based on evaluating a risk of a hazard with the least one object based on the determined state parameters and current location and current speed of the autonomous device relative to a safety zone from the set of safety zones;

determining a control parameter for controlling action of the autonomous device based on the determined reward value; and initiating sending the control parameter to the autonomous device to control action of the autonomous device, wherein the control parameter is dynamically adapted to reduce the risk of hazard with the at least one object based on reinforcement learning feedback from the reward value, wherein the discrete state parameter comprises:

a current direction of the autonomous device;

a current speed of the autonomous device;

a current location of the autonomous device;

a distance of the at least one obstacle from a safety zone in the set of safety zones for the autonomous device;

a direction of the at least one object relative to a surface of the autonomous device; and a risk value for the at least one object based on a classification of the at least one object.

2. The method of claim 1, wherein the risk management node is onboard the autonomous device.

3. The method of claim 1, wherein the state parameters are determined from inputting to the risk management node the one or more environment parameters from the scene graph structure.

4. A computer program product comprising:

non-transitory computer readable medium storing instructions, when executed on at least one processor causes the at least one processor to carry out a method according to claim 1.

5. The method of claim 1, wherein the scene graph structure includes a first object, a second object, and a relationship of the first object with the second object, the autonomous device, and the environment.

6. The method of claim 1, wherein generating the scene graph structure comprises extracting the at least one object from the sensor data using a computer vision system.

7. A risk management node, the risk management node comprising:

at least one processor; and at least one memory connected to the at least one processor and storing program code that is executed by the at least one processor to perform operations comprising:

generating a scene graph structure of an environment based on sensor data, wherein the scene graph structure includes at least one object, a relationship of the least one object with an autonomous device and the environment, and one or more environment parameters;

determining state parameters from the scene graph structure of the environment that includes the at least one object, the autonomous device, and a set of safety zones for the autonomous device relative to the at least one object, wherein determining the state parameters comprises converting each of the one or more environment parameters to a discrete state parameter;

determining a reward value for the autonomous device based on evaluating a risk of a hazard with the least one object based on the determined state parameters and current location and current speed of the autonomous device relative to a safety zone from the set of safety zones;

determining a control parameter for controlling action of the autonomous device based on the determined reward value; and initiating sending the control parameter to the autonomous device to control action of the autonomous device, wherein the control parameter is dynamically adapted to reduce the risk of hazard with the at least one object based on reinforcement learning feedback from the reward value, wherein the discrete state parameter comprises:

a current direction of the autonomous device;

a current speed of the autonomous device;

a current location of the autonomous device;

a distance of the at least one obstacle from a safety zone in the set of safety zones for the autonomous device;

a direction of the at least one object relative to a surface of the autonomous device; and a risk value for the at least one object based on a classification of the at least one object.

8. The risk management node of claim 7, wherein the at least one object comprises a static item, a dynamic item, or a human.

9. The risk management node of claim 7, further comprising:

repeating the determining the state parameters, the determining the reward value, the determining the control parameter, and the initiating sending the control parameter to control action of the autonomous device.

10. The risk management node of claim 7, wherein the classification of the object comprises an attribute parameter identifying the at least one object as comprising a human, an infrastructure, another autonomous device, or a vehicle.

11. The risk management node of claim 7, wherein the set of safety zones comprise a range of safety zones, wherein each safety zone in the range has a different distance from the autonomous device and the autonomous device has a different speed within each safety zone within the range of safety zones.

12. The risk management node of claim 7, wherein the reward value comprises a defined numerical value based on the evaluated risk of hazard with the at least one object.

13. The risk management node of claim 7, wherein the control parameter is a speed of at least one actuator of the autonomous device.

14. The risk management node of claim 7, wherein the control parameter is an angle of at least one actuator of the autonomous device.

15. The risk management node of claim 7, wherein the one or more environment parameters comprise at least one of:

a distance of the at least one object from a surface of the autonomous device;

an orientation of a surface of the at least one object from the autonomous device;

a direction of the at least one object from a surface of the autonomous device;

a velocity of the at least one object;

a width dimension of the at least one object;

a length dimension of the at least one object; and a height dimension of the least one object.

16. The risk management node of claim 7, wherein the risk management node is onboard the autonomous device.

17. The risk management node of claim 7, wherein the state parameters are determined from inputting to the risk management node each of the one or more environment parameters from the scene graph structure.

18. The risk management node of claim 7, further comprising:

sending the control parameter to a controller for the autonomous device for application to a trajectory for the autonomous device.

19. The risk management node of claim 7, wherein the risk value for the at least one object based on the classification of the at least one object is input to the risk management node from a risk analysis module that assigns the risk value.

* * * * *